United States Patent [19]

Korba

[11] Patent Number: 5,319,611
[45] Date of Patent: Jun. 7, 1994

[54] METHOD OF DETERMINING RANGE DATA IN A TIME-OF-FLIGHT RANGING SYSTEM

[75] Inventor: Larry W. Korba, Ottawa, Canada

[73] Assignee: National Research Council of Canada, Ottawa, Canada

[21] Appl. No.: 40,847

[22] Filed: Mar. 31, 1993

[51] Int. Cl.$^5$ .............................................. G01S 15/93
[52] U.S. Cl. ...................................... 367/98; 367/909
[58] Field of Search .................. 367/909, 99, 900, 98, 367/96, 97; 364/516, 561; 340/903, 435, 436

[56] References Cited

PUBLICATIONS

Watanabe et al.; "An Ultrasonic Visual Sensor for Three-Dimensional Object Recognition Using Neural Networks"; IEEE Transactions on Robots and Automation, Vol. 8, No. 2, Apr. 1992; pp. 204–209.

Turennout et al.; "Following a Wall with a Mobile Robot Using Ultrasonic Sensors"; Proceedings of the 1992 IEEE/RSJ International Conference on Intellegent Robots and Systems; Jul. 1992; pp. 1451–1456.

Sabatini; "Active Hearing for External Imaging Based on an Ultrasonic Transducer Array"; Proceedings of the 1992 IEEE/RSJ International Conference on Intellegent Rotobs and Systems; July 1992; pp. 829–836.

*Primary Examiner*—Daniel T. Pihulic
*Attorney, Agent, or Firm*—Pascal & Associates

[57] ABSTRACT

A time-of-flight range sensing system for a vehicle such as a mobile robot comprised of a number of sensors that are situated at preset locations and aligned with particular orientations on the vehicle. Each sensor may consist of single or multiple transmitting transducers and single or multiple receiving transducers. Each sensor provides a means for changing the effective sensing volume of the sensors or it has two or more separate processing channels for processing the time-of-flight information with several different effective sensing volumes using the sensor signal processor. The sensor signal processor also provides a means for collecting information regarding the echo signal peak value and the noise present in the received signal before reception of the first echo. A sensor array processor excites the transducers, measures the time-of-flight of arrival of the first echo above a predetermined threshold and combines the data from the multiple signal processing channels so as to increase the range data gathering speed and to improve the fidelity of the range data received. The sensor array processor determines from the range data received and the signal and noise information the position and orientation of gross geometric features in the environment (flat surfaces, posts inside corners and outside corners) relative to the sensor array. This information may be used by a navigation control processor to avoid collisions, recognize features in the environment, or map the environment.

16 Claims, 18 Drawing Sheets

Prior Art

3 Different DGC Profiles

Yield 3 Different Sensitivity Volumes

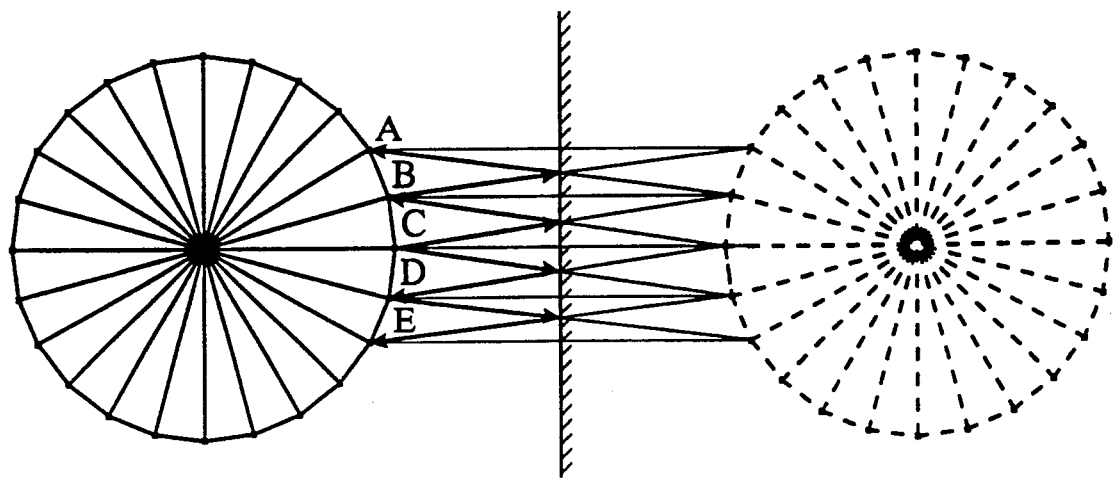
Fig. 10a
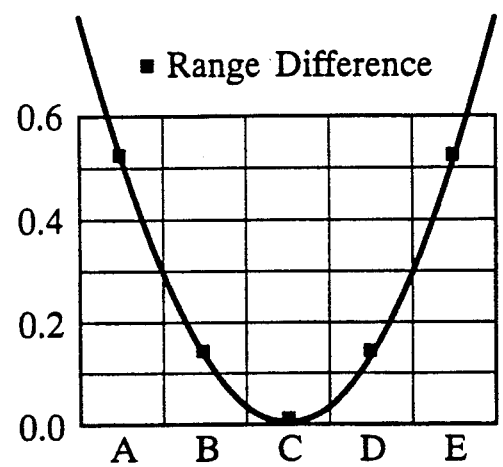
Fig. 10a.1

Group:

a) 2 or more sensors with range values that are within several cm of each other and/or:

b) As in a) and groups with 3 or more sensors have range relationships that have range values that are largest at the outside edges of the groups and smallest at the center

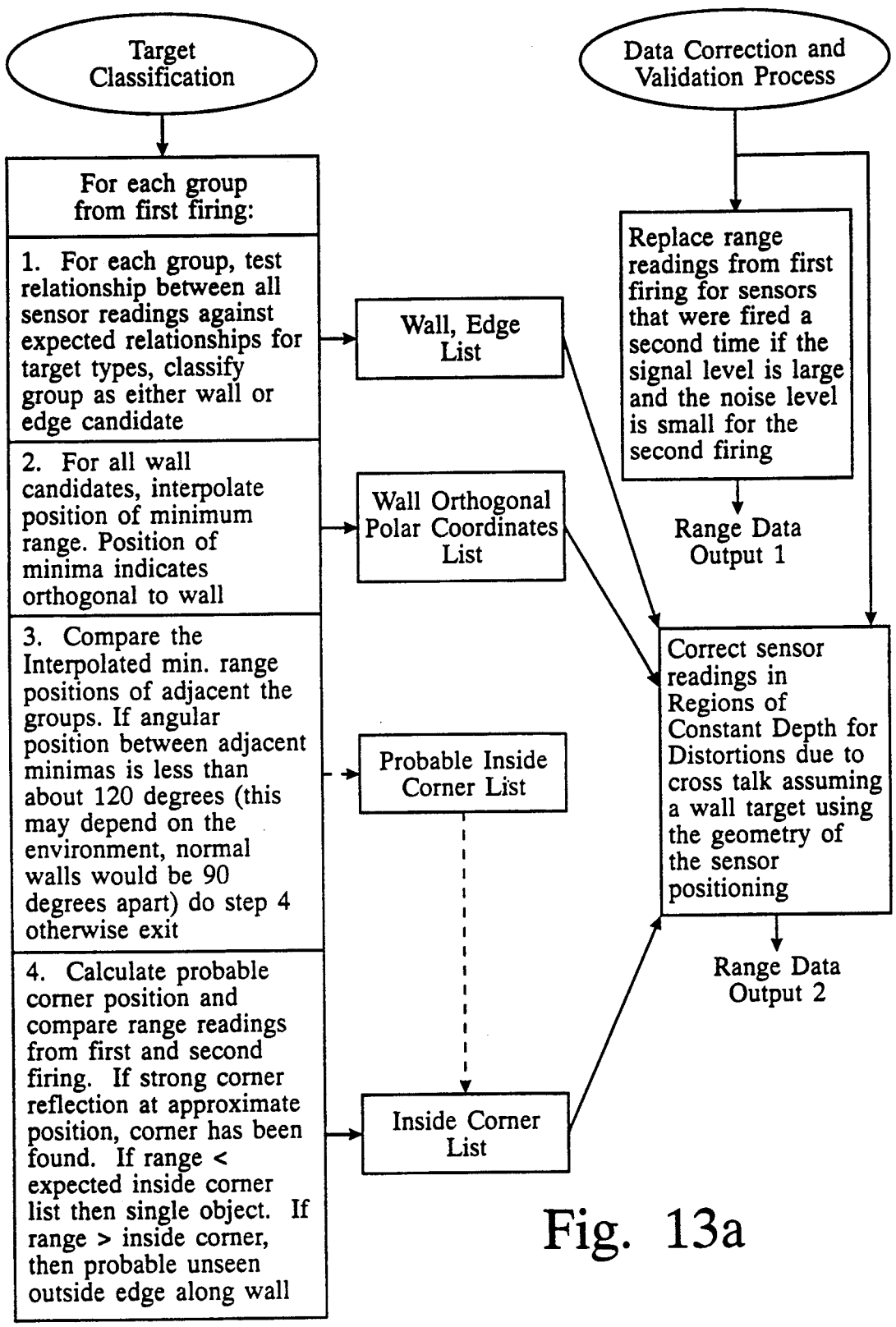

METHOD OF DETERMINING RANGE DATA IN A TIME-OF-FLIGHT RANGING SYSTEM

FIELD OF THE INVENTION

This invention relates to a time-of-flight navigation and obstacle avoidance sensor system for a moving robot or vehicle.

BACKGROUND TO THE INVENTION

An autonomous vehicle or a sensor assisted vehicle is comprised of some type of sensor system for sensing the environment through which the vehicle navigates. The sensor system preferably has the ability to sense objects in the path of movement of the vehicle so that the vehicle control system can take appropriate action. The sensor system may also be used to sense objects at the sides and to the rear of the vehicle. The vehicle control system may use this sensor information to:

1. alter the speed or steering of the vehicle to avoid collision with objects in the environment,
2. determine position and orientation of features or objects in the environment in order to search for and or follow those features. Examples of such features are walls to be followed down a corridor, door openings for finding passages out of rooms, and corners of walls to find branches in corridors, and smaller objects such as posts that are to be avoided,
3. determine the position and orientation of features of objects in the environment in order to form an associative map that indicates where objects and features are in the environment,
4. determine the position and orientation of objects in the environment that the vehicle's control system will use as navigational landmarks, for registration of the vehicle's drive system while it is following a particular trajectory or to memorize and later locate a particular position in the environment.

Sensor systems that perform the sensing function required for such an application are time-of-flight ranging systems (ultrasound, light, radio waves), as well as laser ranging apparatus and passive scene analysis using computer vision. The ultrasound time-of-flight systems have been preferred because of their low cost.

Most often ultrasonic systems use the time-of-flight technique to measure the distance between the sensor and an object. One or more sensors are excited to send a burst of sound and the same or several other sensors are used to receive the echoes from the environment. Since the velocity of sound in air is known, the time between the emission of the sound burst and the reception of the first echo from an object may be used to determine the distance between the object and the detector.

However, there are a number of problems associated with ultrasonic detectors.

For example, it is difficult to obtain reliable and consistent range signals in most environments. This is due mainly to the specular reflections experienced by ultrasonic signals in most indoor environments. (The wavelength of sound in air is larger than the roughness of most indoor surfaces.)

In order to obtain the angular resolution required to determine the angular position of objects with respect to the vehicle, sensors may be positioned around the vehicle, or concentrated and pointed in the direction of motion of the vehicle. The speed of range data collection is limited by the speed of sound in air (about 340 meters per second, depending mainly on temperature and humidity) and the potential for errors due to the chance of a sound burst from one sensor causing an echo contribution to another sensor. This effect is called crosstalk.

System designers may excite the sensors in a manner that minimizes crosstalk. For example, in a system with a circular array of 24 sensors, orthogonally positioned sensors would be fired simultaneously—four at a time, and range data collected from them. Hence 24 sensors would need 6 excitations to capture the range data from all sensors.

In an attempt to further increase range data acquisition speed, some designers reduce the depth of view for all sensors. This means that the sensor array processor only monitors the echo data lines from the sensors long enough to measure the time of arrival of echoes from objects closer than 1 or 2 meters. In addition, a delay time may be added between firings to allow the previous sound emissions to decay. These techniques require careful adjustment of transducers excitation patterns, delays between firings, and depth of view to avoid crosstalk.

Due to the unreliable nature of the range signals, in order to determine position of objects and features in the environment, a type of temporal and spatial averaging has been used. This involves a vehicle which has a number of sensors positioned around its perimeter. The sensors are excited repetitively while the vehicle moves around the environment. Measurement devices attached to the vehicle's wheels are used to determine the relative motion of the vehicle. Range information regarding potential targets in the environment are recorded along with their positions relative to the vehicle in a two dimensional (2D), map-like representation. As the vehicle moves, the sensors view different volumes of space. This information is used to increase or decrease the probability of a target's appearance within a particular location. Using this system, over the course of time and movement in the environment, a more reliable idea of the position of objects is gained.

This system has a number of problems. It is time consuming, requiring data to be collected over a period of time and required movement in order to determine whether or not the sonar data are reliable.

It requires significant data collecting and storage. Over the course of time or for a large area, a large amount of data may be collected before there are data from sensors in other positions that confirm or deny the position of objects in the environment. To reduce storage requirements and increase processing speed, the granularity of the grid for the two dimensional map may be increased (i.e. cell locations within the map are increased in size). Unfortunately this also reduces the resolution of the system.

Errors due to inaccuracies in the dead reckoning system during movement cause the range data to be distorted.

SUMMARY OF THE INVENTION

The present invention provides a method for increasing the rate of range data collection from an array of time-of-flight sensors. In addition, it provides a means for improving the quality of the range data collected (i.e. the range data more accurately reflect the environment). Further, the present invention provides a method for measuring the likelihood of a good range measurement, and it provides a means for identifying certain features of the environment (such as walls, posts, inside and outside corners) and for extracting their location relative to the vehicle in the environment using one or two excitations of the sensors in the array.

The problems of the prior systems described above are overcome and the above methods and means are realized in a time-of-flight ranging array system for a vehicle such as a mobile robot.

In accordance with one embodiment of the invention, a ranging array system includes the following:

1. A number of separate time-of-flight sensors that employ a means for altering the volume of sensitivity (VS) for the sensor. For an ultrasound pulse-echo ranging system, this may be accomplished using at least one channel of variable rate depth gain compensation and a controllable excitation signal for each sensor.

In another embodiment of the invention, each transducer can have several separate amplification and/or detection channels. This reduces the number of sensor excitations required.

In yet another embodiment the system can include several coaxial sensors or sensor elements that are excited or used as receivers in different combinations in order to change the volume of sensitivity.

In still another embodiment, different frequencies are used for the excitation bursts of the sensor. Since a sensor may be more efficient for one frequency over another, by varying the excitation frequency, one varies the effective volume of sensitivity for the sensor.

2. A Sensor Signal Processor (SSP) determines the amount of echo signal (e.g. noise) that is evident in the echo response before the appearance of the main echo and before measurement of the amplitude or energy in the echo detected as a viable target by the pulse echo system. These noise signals are used to determine the quality of the range value determined from the echo position in time. They are used to determine which range data from different sensors are more likely to be accurate.

3. A Sensor Array Processor (SAP) sends and receives data to and from the rest of the system, which includes a Navigation Control Processor (NCP). The NCP commands the SAP to perform functions and the SAP sends data in response. The SAP controls the settings for the depth gain control, firing pulse size and/or frequency for the sensor signal processor, to control the effective volume of sensitivity of the sensors. The SAP also determines the time of arrival of the first echo from the transducer, and controls the operation of and gathers data from the sensor signal processor regarding the triggering echo signal size and the amount of echo information before the triggering echo. It controls the firing sequence and firing pattern for the sensors so as to ensure adequate coverage of the sensed volume by the sensor array in a fashion that optimizes the speed and resolution with which the sonar system gathers data. The SAP also calculates a correction factor for range data gathered so that the range data from individual sensors better reflect distances to particular target types, and calculates the position, and orientation of walls, inside corners and outside corners and other objects from the sensor array.

Although these calculations are performed within the SAP, other implementations may have a separate process or processor operating within the navigation control processor to perform some of these operations.

In accordance with another embodiment of the invention, a method of determining range data in a time-of-flight ranging system is comprised of emitting plural energy emissions from at least one transducer in the same direction, one emission being emitted and received with a broad sensing volume and another with a narrow sensing volume, analyzing echoes resulting from the emissions to determine the existence and position of an obstacle based on the broad sensing volume, and determining the existence and position of the obstacle or features thereof based on the narrow sensing volume in the presence of anomalous resulting determinations based on the broad sensing volume.

BRIEF INTRODUCTION TO THE DRAWINGS

A better understanding of the invention will be obtained by reference to the detailed description below, in conjunction with the following drawings, in which:

FIG. 1 is a block diagram showing a mobile robot constructed and operated in accordance with one embodiment of the invention, FIG. 2a is a block diagram of a typical prior art time-of-flight ultrasonic system, FIG. 2b is a block diagram of a sensor signal processor as in the present invention, FIG. 2c shows an alternative embodiment of a sensor signal processor with two channels of depth gain compensation, FIG. 3 shows a timing diagram for the control of the system in FIG. 2a, FIGS. 4a and 4b are graphs which show the effect on the sensing volume of a sonar transducer for different depth gain compensations, FIG. 5 shows a number of sensitivity volumes (as projected into the sonar sensor's radial plane) for a single Polaroid industrial grade sonar transducer connected to one embodiment of the sonar array processor, FIG. 6 is a diagram of one embodiment of the sensor array processor.

FIGS. 7a and 7b illustrate some of the signals produced by a sonar system,

FIG. 8a shows one possible arrangement of transducers that will provide 360 degree coverage around the vehicle with an overlap of the sensing volumes, FIG. 8b shows the overlap of sensing volumes for a circular array of 24 sensors, FIG. 9 is a diagram illustrating the geometry used to calculate the crosstalk relationships between the range measurements for two sensors and the distance and orientation of a wall reflector, FIG. 10a illustrates schematically the typical time-of-flight paths for sonar echoes for a wall target.

FIG. 10a.1 is a graph showing a plot of the relative differences between adjacent sensors affected by the wall and the shortest range for the group for the configuration in FIG. 10a, FIG. 10b shows typical echo paths for the edge of a wall, FIG. 10c shows typical echo paths for an inside corner, FIG. 10d illustrates the geometric technique that is used to determine the position of a potential inside corner.

Figure 11:
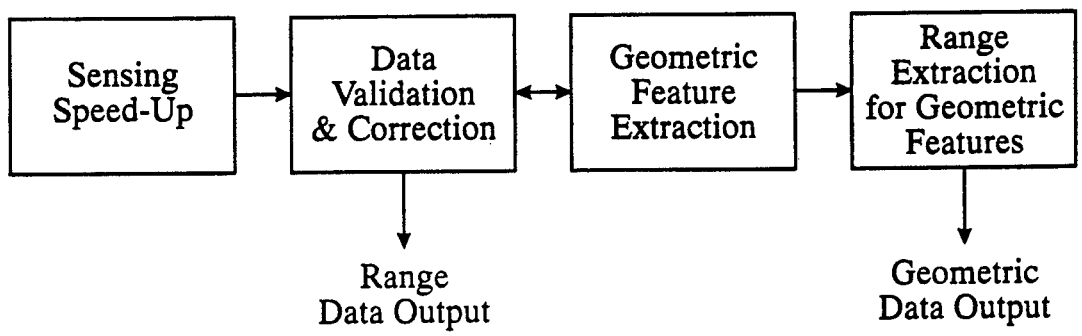
FIG. 11 is a block diagram of the processes performed by the SAP.
Figures 12A, 12B:
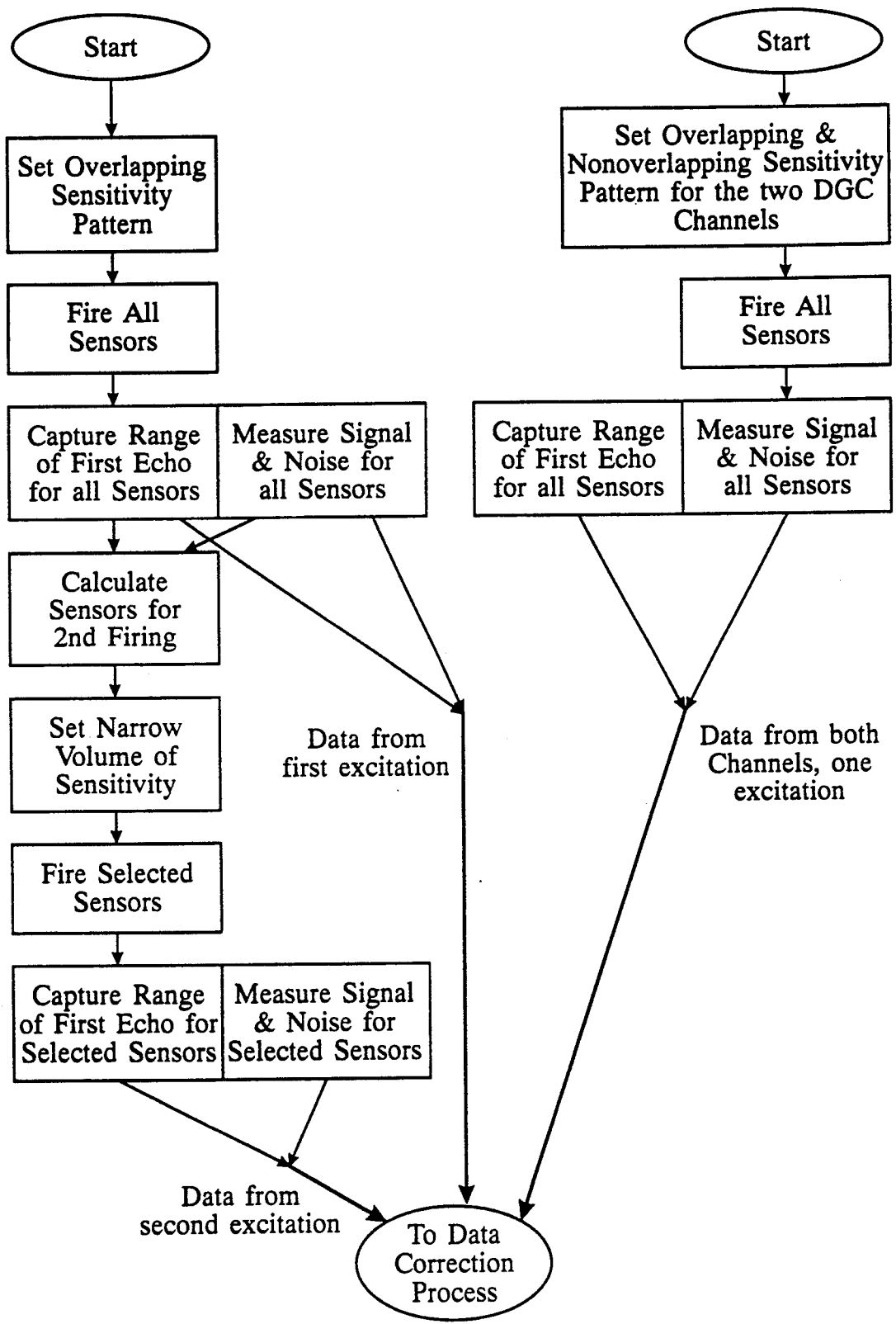
Figure 12C:
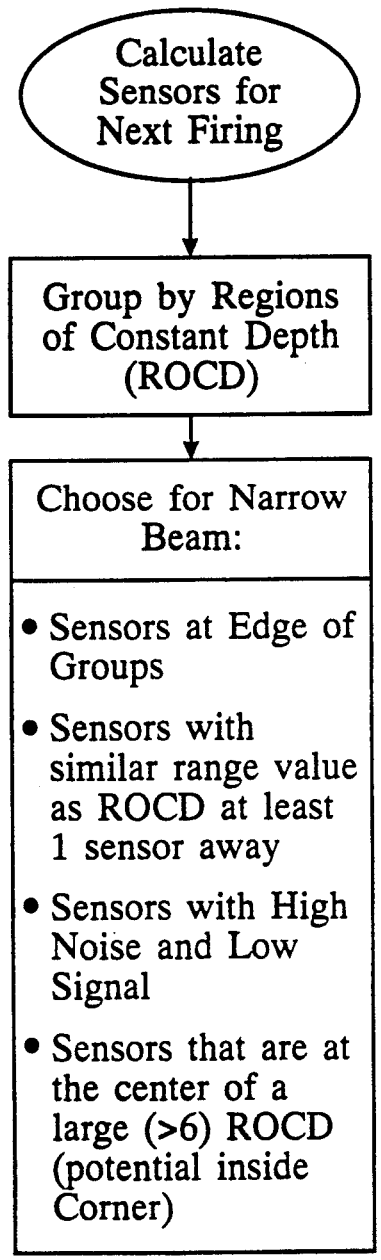
Figure 14:
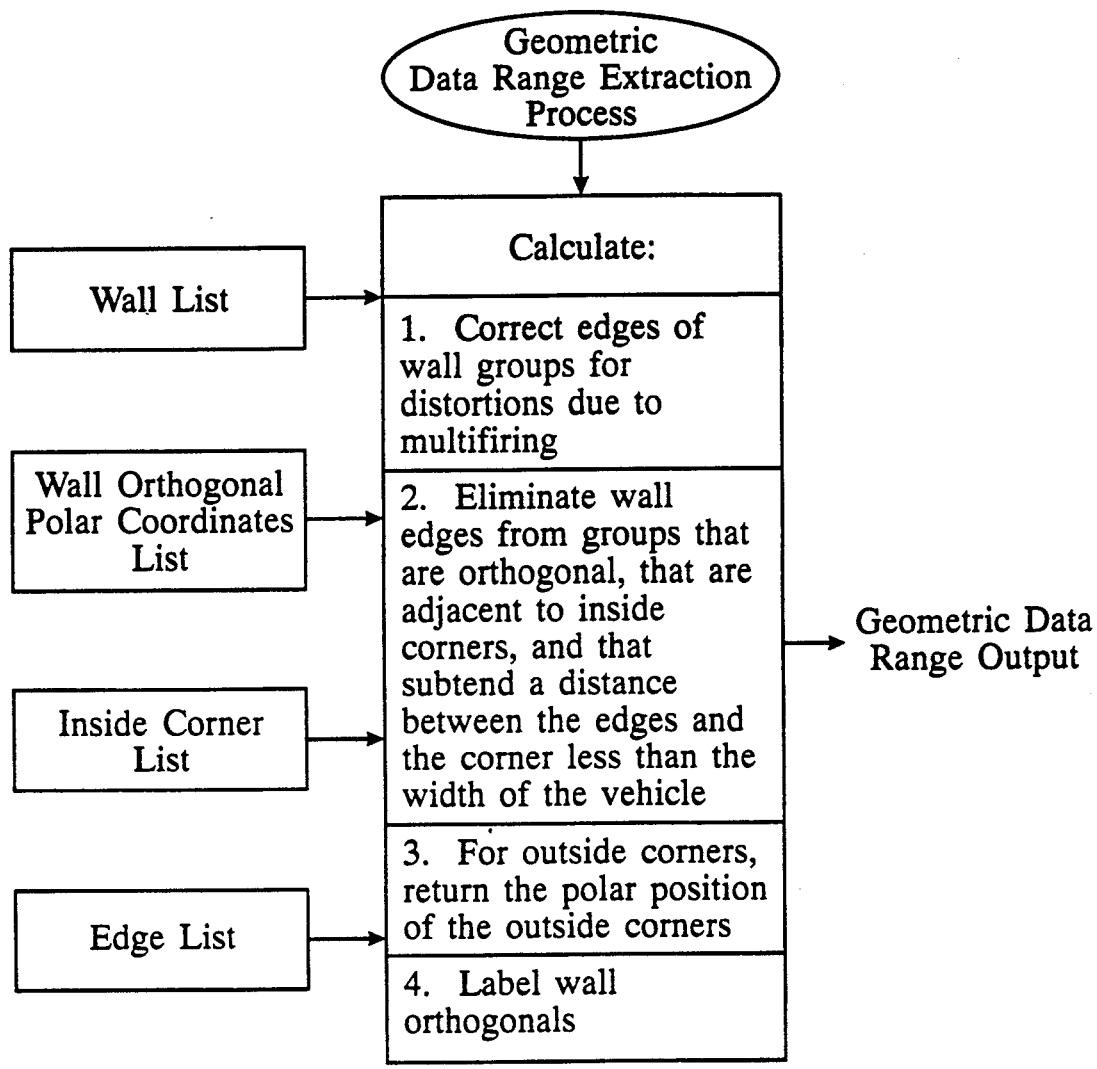
Figure 15A:
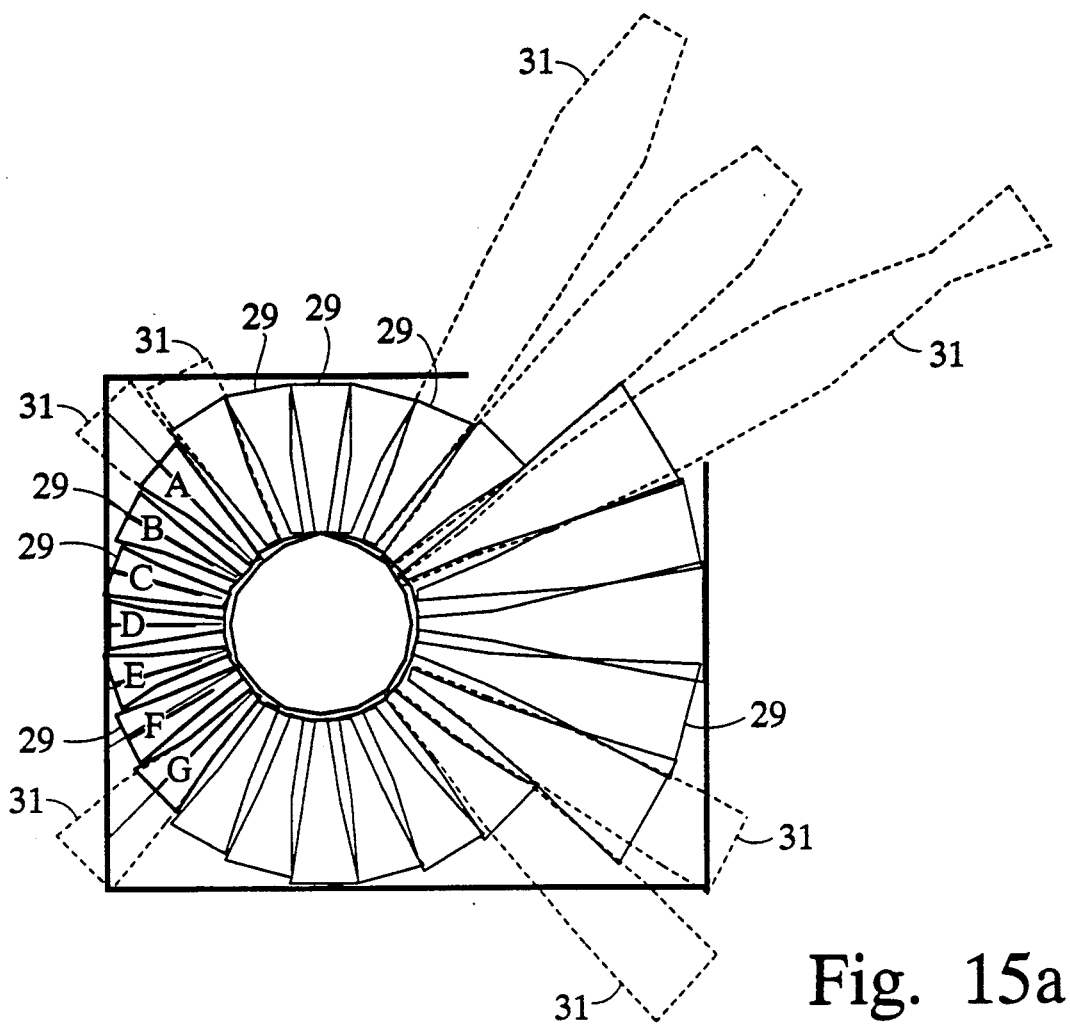
Figure 15B:
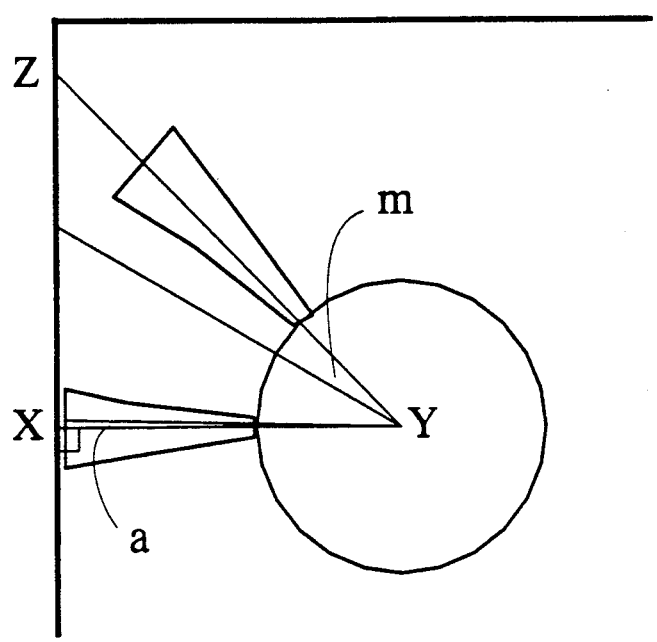

FIGS. 12a and 12b are the overall block diagram of the sensing speed-up process of FIG. 11 for a system with a single depth gain compensation (DGC) amplifier, FIG. 12c is a block diagram of the process to determine which sensors should be excited for the second excitation of the sensors, FIG. 13a is a diagram of the data validation and correction process of FIG. 11, FIG. 13b is the block diagram for the classification process used in FIG. 11, FIG. 14 is a block diagram of the geometric range data extraction process of FIG. 11, FIG. 15a is an example of range data extracted using the invention, showing the sensed ranges for the first selected second firings, and FIG. 15b shows the geometry used for calculating range data that are corrected based on the extracted geometric features.

DETAILED DESCRIPTION OF THE INVENTION

Figure 1:
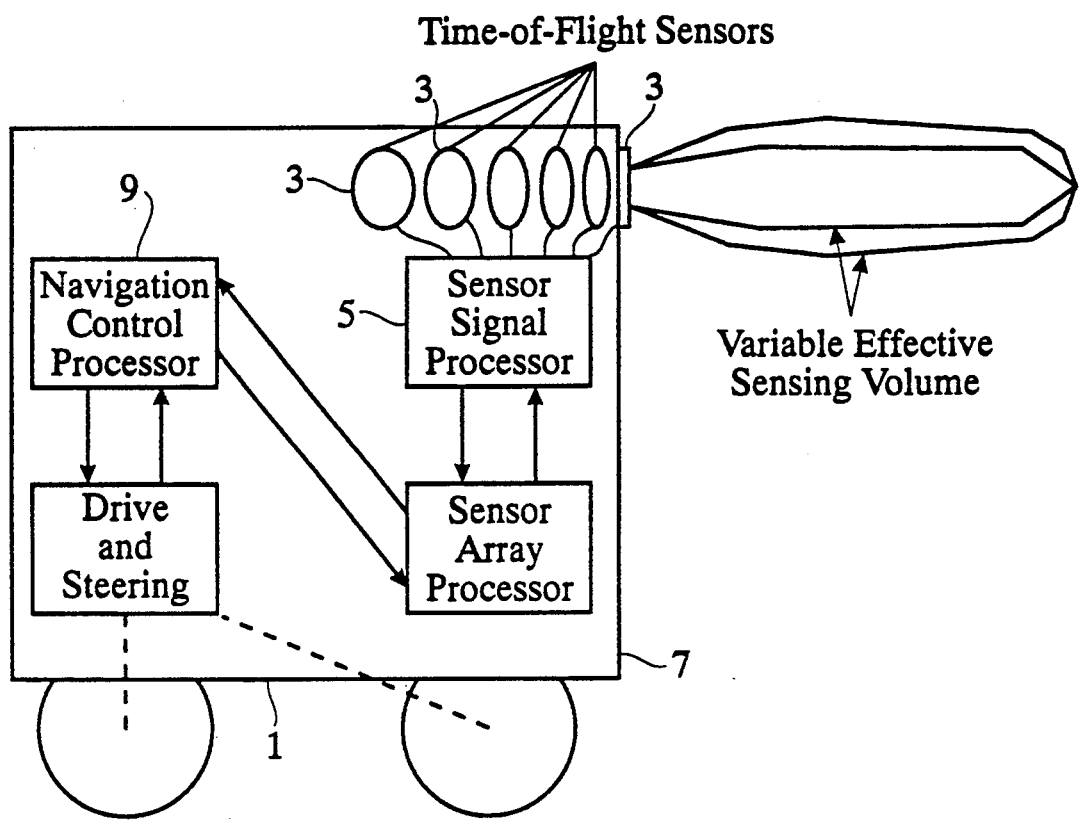

FIG. 1 shows in one embodiment a robot vehicle 1 equipped with a number of time-of-flight ranging sensors 3, a sensor signal processor 5, sensor array controller 7 and a navigational processor 9. In this invention performance of the ranging sensors is improved so as to increase the rate at which the sensors 3 scan the surrounding environment, to increase the quality of the range data gathered from the sensors and to rapidly determine the presence and characteristics of certain features in the environment (flat surfaces, corners, posts and openings).

The range sensor system is based on time-of-flight, i.e. each sensor is comprised of one or more transducers that emit a signal of energy (light, radio frequency or sound) into the environment within the sensor's field of view, one or more transducers then receiving the echoes corresponding to targets in the environment. A sensor signal processor (SSP) 5 then measures the time between the emission of the energy and reception of the echoes. Of principal concern here is the time of arrival of the first echo received by the transducer. In other words, the sensor system provides an output value that is related to the distance of the nearest object to the sensor. Each sensor and/or its processing circuits (within the sensor or the SSP) contains some means for controlling the effective sensing volume. The effective volume of coverage is the volume within which an object of a specified size will trigger a range reading for the sensor.

In a preferred embodiment, the sensor is a time-of-flight ultrasonic sensor wherein each transducer acts as both the emitter of a pulse of sound energy and the receiver of returned echoes from the environment. Since the strength of echoes from targets within the sensing volume is reduced as the targets are at a greater distance from the transducer, the sensor system provides an increasing amplification of the transducer signals over time. The effective volume of coverage may be changed for a sonar system by changing the way in which the gain of the signal processing system changes over time.

Figure 4A:
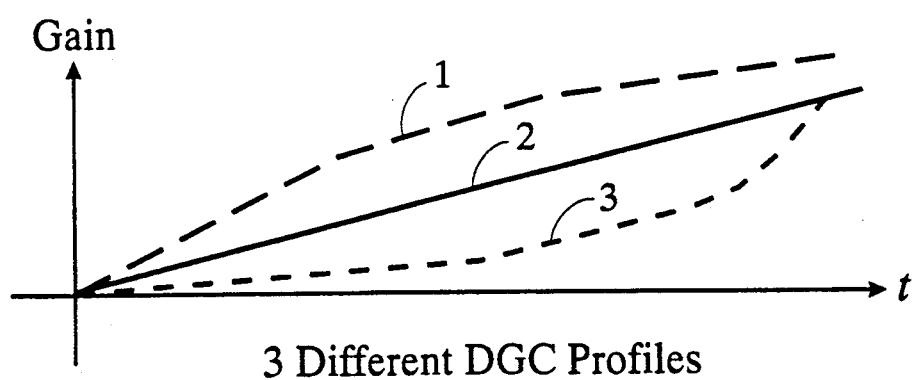
Figure 4B:
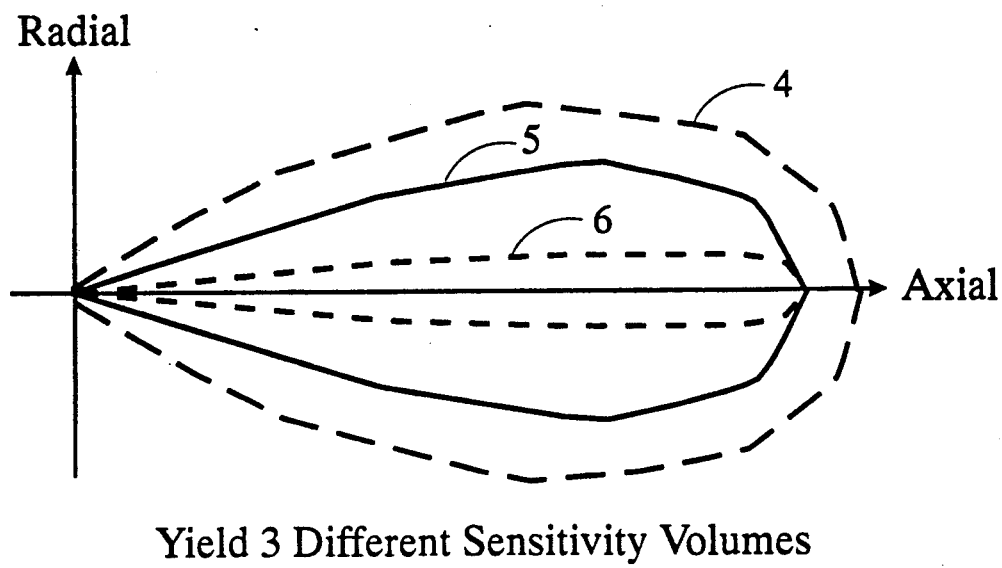

FIGS. 4 and 4b illustrate the net resulting effect of changing the gain over time. Depth gain control (DGC) profiles shown in FIG. 4a illustrate three different gain functions that may be applied to the signals received by a sonar transducer. These signals represent a changing voltage that may be applied to a voltage controlled amplifier. The gains however may be stepped from one level to another at different rates in systems with digitally controlled gains or may be swept at different rates or with different functions with analog voltage controlled gains.

Curve 1 in FIG. 4a illustrates a gain that increases rapidly at first and remains higher throughout the receiving time period. The effect of this gain curve is shown in FIG. 4b as the volume of sensitivity (VS) labelled 4. This diagram represents the limit of the sensing volume of the sensor system in a plane that includes the principal axis of the transducer (the line that extends orthogonally from the center of the transducers' diaphragm in the direction of sound projection. The VS may be measured by passing a target across the field of view of the sensor and recording the points at which the sensor system produces an appropriate range value.

Gain profiles 2 and 3 of FIG. 4a produce the sensing volumes 5 and 6 of FIG. 4b.

There are often ways which may be used to change the effective sensing volumes of a pulse-echo ultrasonic sensor, which include changing the energy in the excitation burst applied to the transducer, altering the effective size of the transducers by changing the number of transducers electrically connected together and treated as one group during excitation or reception, using separate transducers that have different sensing volumes but are positioned coaxially or very close together, or varying the operating frequency of the sensor.

Figure 5:
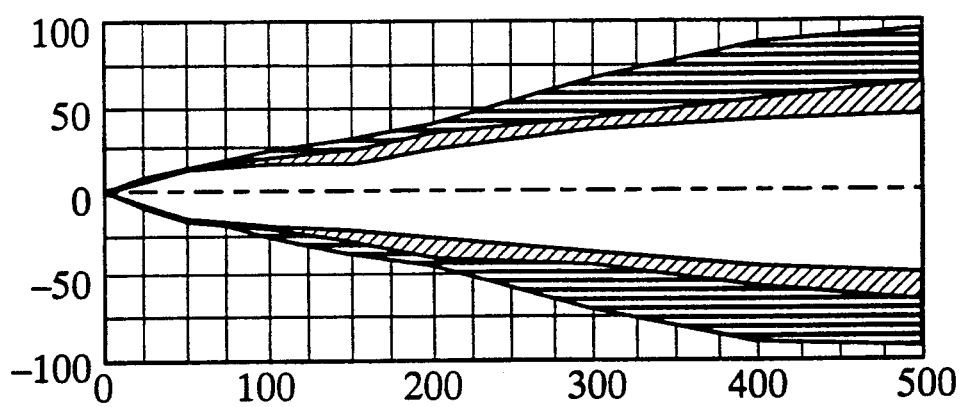
Figure 6:
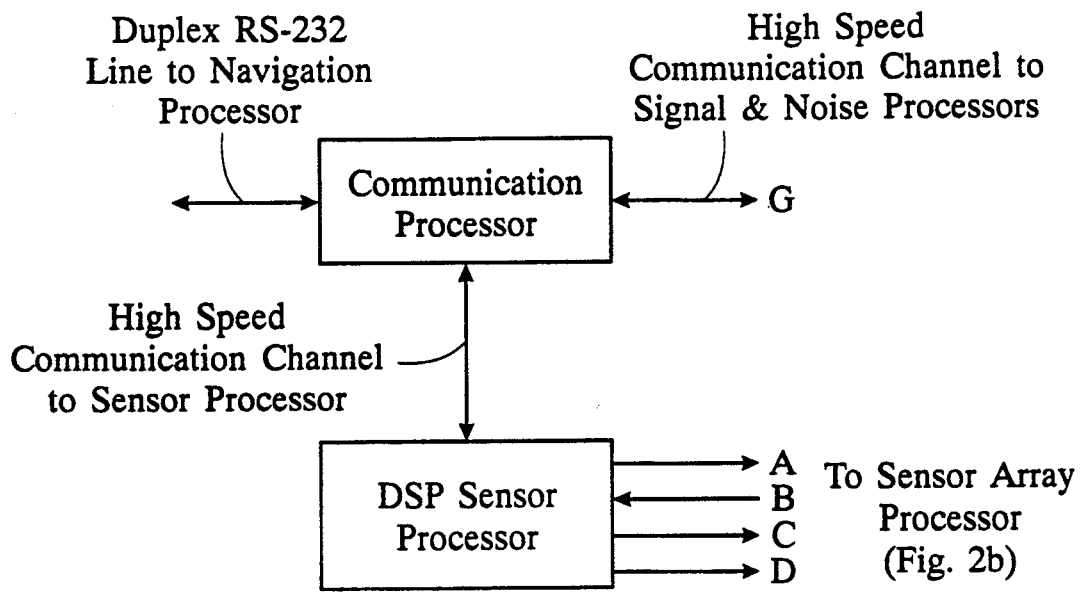

FIG. 5 illustrates several different volumes of sensitivities for an actual ultrasound system. These data were collected from a sensor system using a Polaroid, laboratory grade transducer. The effective VS was altered by changing the excitation energy as well as the DGC curve.

Figure 8A:
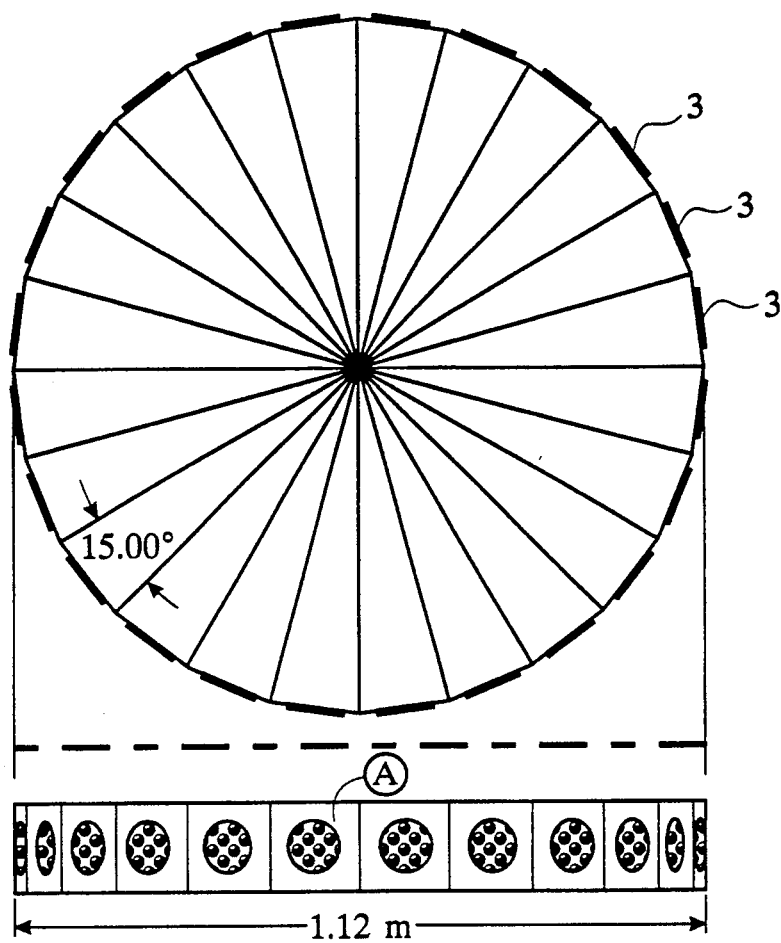
Figure 8B:
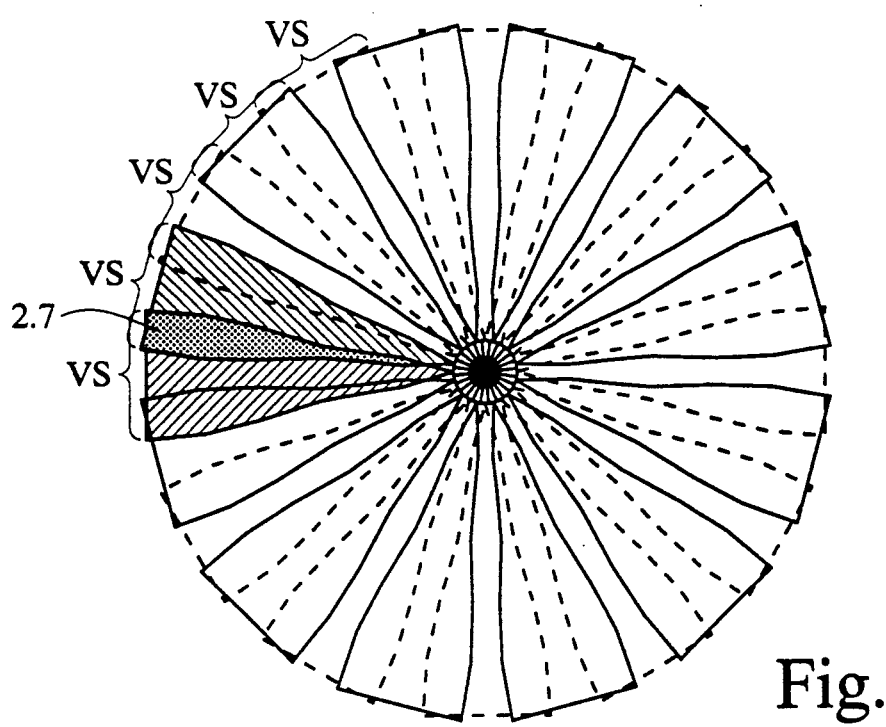

The position and orientation of the sensors around the vehicle must be predefined. FIG. 8a illustrates one embodiment for the sensor configuration. In this case, twenty-four transducers 3 are positioned evenly around the circumference of a twenty-four sided regular polygon. The principal axis of each transducer points out from the center of the transducer array (fifteen degrees between principal axes of the transducers). To provide an improved signal-to-noise ratio of the range data and to extract geometric data, it is essential that the sensing volumes for neighboring sensors overlap slightly when those sensors are set to their widest VS. FIG. 8b illustrates the overlap 27 of the effective VS.

Sensor systems using this invention may be constructed with as few as two sensors as long as the orientation angle of the sensors are adjusted so that the VS overlap, for the wider VS setting. The sensors may be arranged so that the VS principal axis lie in a plane or they may be positioned on a sphere to provide a larger volume of coverage.

Figure 2A:
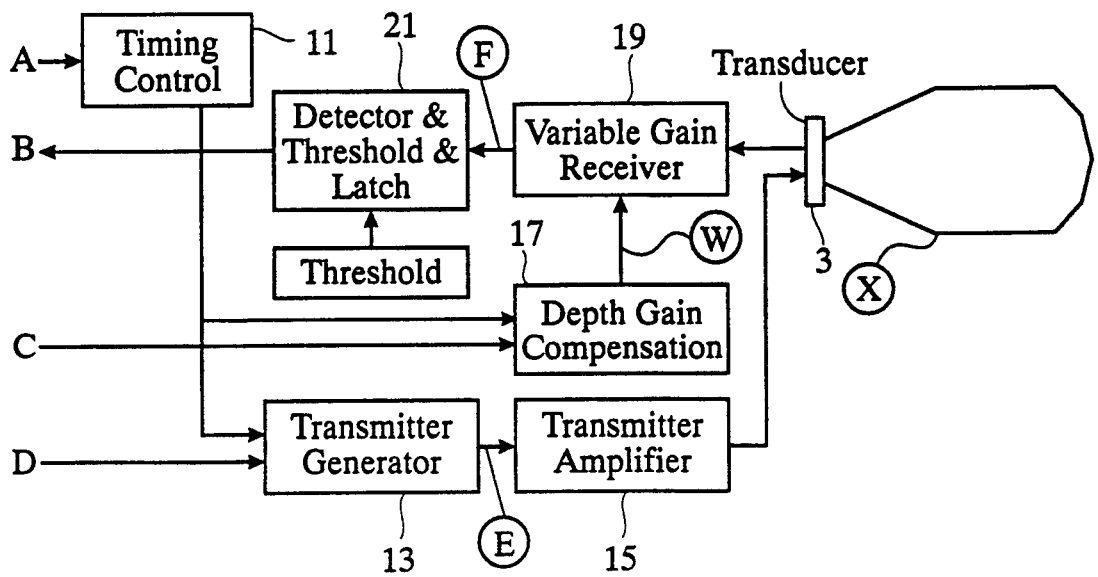
Figure 3:
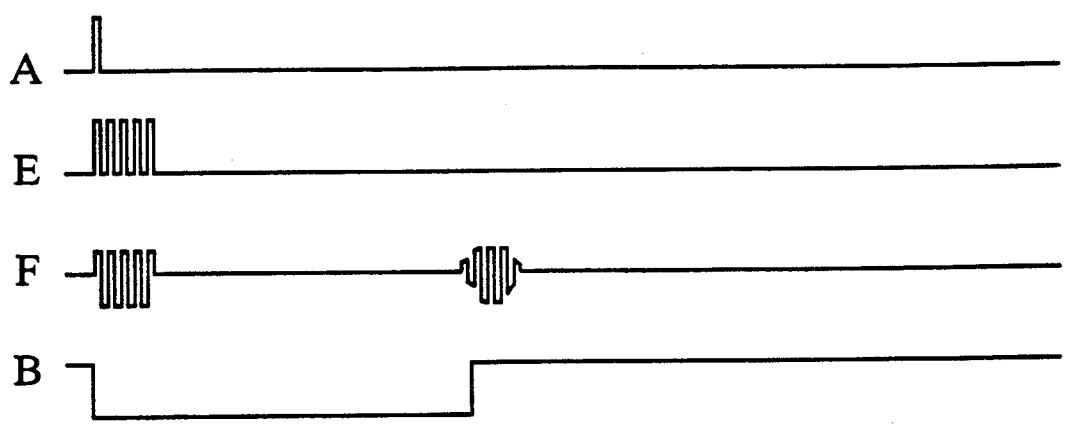

The typical known sensor signal processor used with pulse-echo ultrasound systems is shown in FIG. 2a. FIG. 3 is a timing diagram for the signals in the block diagram of FIG. 2a. A signal from a controlling device is applied at point A (see correspondingly labelled timing diagram in FIG. 3). This starts the sensor activity. The timing and control module 11 signals a transmit signal generator 13 to produce an excitation signal for the transducer 3. In the case of sonar time-of-flight transducers, this may be a burst signal several milliseconds long at one frequency (e.g. 50 kHz) or a more complex signal of varying pulse widths and/or frequencies. The signal applied at point D is used to select different types of excitation signals (shown at point E). As indicated above, this provides another means for changing the sensing volumes for the transducers. A transmitter amplifier 15 increases the amplitude of the excitation pulse so that it is adequate to excite the transducer 3. In a preferred embodiment, the transducer may be an electrostatic transducer (e.g. one which is sold by Polaroid Corporation). The transmitter amplifier 15 in this case generates the appropriate voltage bias and signal swings for proper transducer function.

Once the signal has been transmitted, a depth gain compensation module 17 starts to generate a control signal for a variable gain receive amplifier 19 so that the more distant echoes (the ones that arrive later) are amplified by greater amounts. Signal C controls the preprogrammed rates of change for the depth gain compensation.

The output signal F from the variable gain amplifier 19 is then detected (rectified), filtered and compared against a threshold to produce an output B in module 21, If the detected level is higher than the threshold level, a latch is set. The net effect of the latch included in this circuit 21 is to ensure that the circuit signals the time of arrival of only the first echo sensed that is above a threshold level.

The sensor signal processor used in an embodiment of the present invention adds an additional system to the above-described sensor signal processor that measures the size of the signal that is accepted as the first echo received by the transducer and the amount of signal that was received before that echo's arrival (noise). To measure that noise component, processor 23 integrates the amount of signal that appears at the output of the depth gain control amplifier 17 before arrival of the first echo (after conversion in A/D converter 25, if necessary). Processor 23 measures either the height or the energy in the first echo. Both of these data are measured, stored and sent to the sensor array processor 7 by processor 23.

Figure 2B:
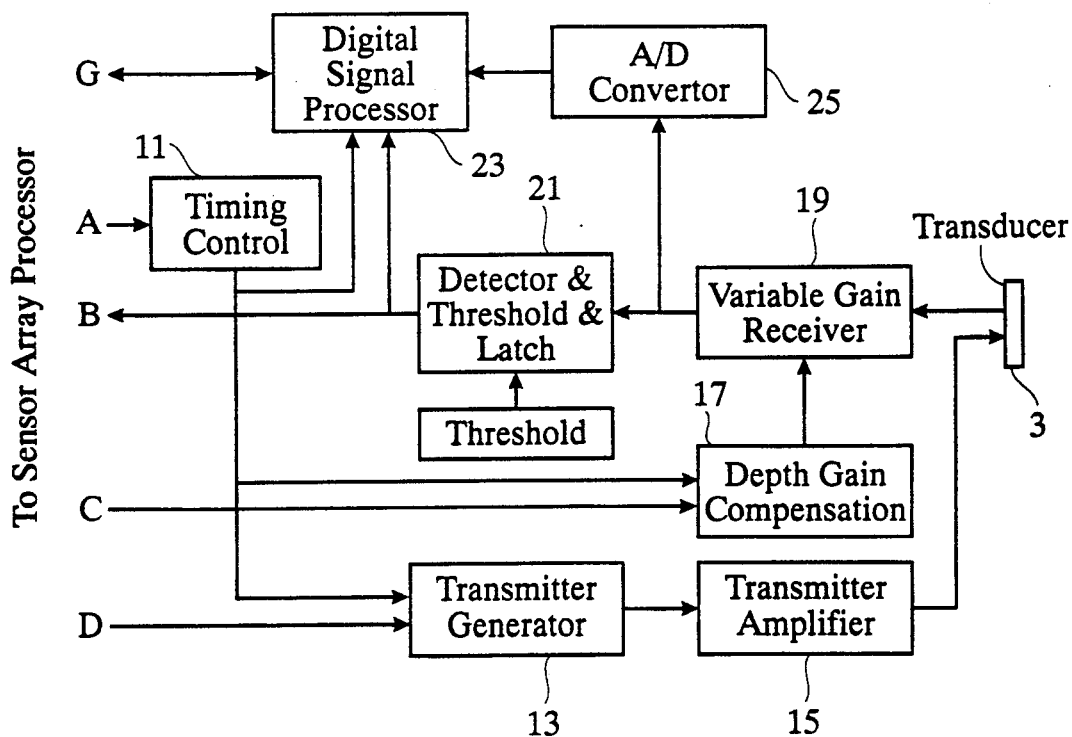
Figure 7A:
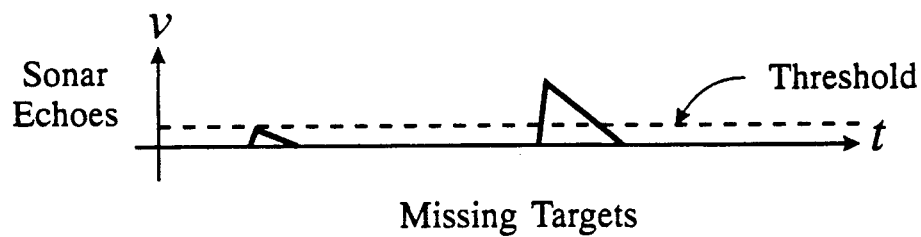

FIG. 2b shows an embodiment of the invention where a digital signal processor (DSP) or a microcontroller captures this information, although other elements could be used. A signal from the timing and control block 11 indicates to the DSP 23 when to start measuring the noise. Noise is considered to be any signal that appears at the output of the depth gain amplifier 17 before the arrival of the echo signal that is larger than a threshold. This signal may be caused by the arrival of echoes that are smaller than the threshold as shown in FIG. 7a.

Figure 7B:
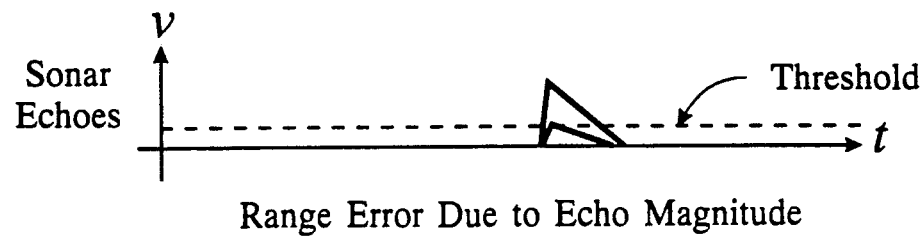

FIG. 7b illustrates a case in which either a weak or a strong echo signal is captured by the system. A range error is incurred when a weak echo triggers the sensor system due to the slower rise time of the lower amplitude echo. To capture the noise data the DSP 23 integrates the DGC amplifier 15 output signal over time by adding consecutive signal samples until the first echo above the threshold arrives. When an output appears at point B, the DSP 23 measures either the height of the echo or the amount of energy in the peak area.

One DSP may be used to measure the signal and noise components of a number of sonar channels. Whenever the sonar transducers are activated, the signal and noise processor is activated at the same time. The information captured by the signal and noise processor is used to determine the validity of the range data captured. Instead or as well as capturing the peak signal level of the triggering echo, the system may measure the slope of the rising edge of the detected echo or the amount of energy in the echo.

The signal and noise data may be employed in a variety of ways. The signal level may be used to adjust the range data for a sensor so as to correct for the error due to echo amplitude. If the range triggering echo is small, the range produced for the sensor is longer than it would be if the echo amplitude were large. The level of the peak value is used in this case to decrease the measured range for the sensor in a manner that is inversely proportional to the size of the range triggering echo.

A large noise level appearing on the sensor channel before the arrival of the triggering echo indicates a missed weak target (FIG. 7a). The quality of the range data for any transducer is determined by comparing its range and signal and noise levels with those of adjacent transducers. For instance, if a transducer has a noise component that is larger than its neighbors, but its range is close to the same value as its neighbors, then the sensor's range may be incorrect. If the same sensor has a shorter range reading than its neighbors, but a higher noise reading, then most definitely the range reading is longer than it should be. If the range reading is longer than the neighbors and the noise reading is large as well, then the range data may be wrong. The larger the signal level, the higher the likelihood that the sensor received a clean echo from a target. Since the process of calculating the noise involves the integration of a signal over time, the noise level may be adjusted based on the time elapsed before reception of the first echo.

Since there may be an offset voltage at the output of the DGC amplifier, it is important to accommodate the effect this has on the noise output value. An adjusted noise figure may be calculated using the following formula:

$$Ncomp = Noise - K*R$$

where Ncomp is the noise value compensated for range, K is a constant dependent on the DGC amplifier and R is the range (or time of arrival of the first echo).

The signal and compensated noise data may be combined by dividing the signal level by the noise level to provide a noise figure for the range data. The higher this figure is, the better the chance that the range reading is not in error.

Figure 2C:
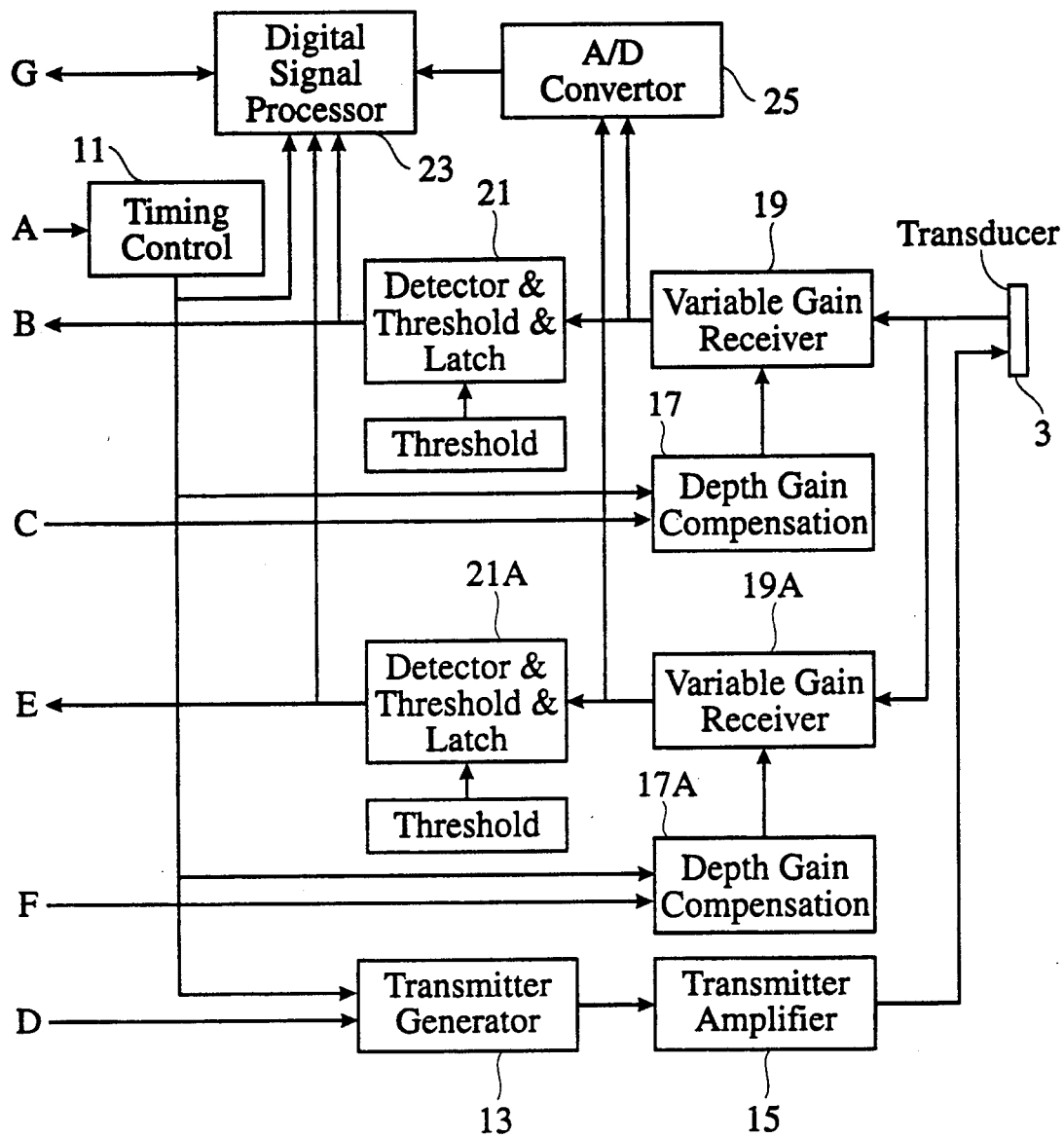

Another modification to the known pulse-echo sensor signal processor required for this invention is shown in FIG. 2c. Here there are at least two processing channels for echo signals. This arrangement allows the echoes to be processed with two different depth gain compensation channels simultaneously (signals C and F are different; one selects a larger sensitivity volume than the other). This speeds the acquisition of range data from the time-of-flight sensor using the sensor excitation process used in this invention.

Range Data Gathering Basic Principle:

Refer now to FIG. 11, which illustrates various processes carried out by the sensor array processor. First there is the sensor excitation process. Second is the data correction and validation process. Third is the geometric feature extraction process. Finally fourth is the process for range extraction for the geometric features.

There are a number of possible ways to implement these processes, although the embodiment described herein was developed using standard programming techniques, within the skill of a programmer. The net effects of these processes may be gained using artificial intelligence techniques such as neural networks or fuzzy logic.

Sensor Excitation Process:

This process provides a means by which the invention speeds up range data acquisition. In this case a time-of-flight ranging system is required with a number of sensors whose VS overlap for at least one setting of depth gain compensation (DGC). The system should have at least one other DGC setting wherein the VS do not overlap for adjacent sensors. Information regarding the signal and noise components for each sensor channel may or may not be used in this process. Use of this information can bolster the performance of the system by increasing the quality of range data gathered.

The sensors are fired in the following manner (see FIG. 12a for a block diagram of the process).

Firstly all sensors 3 are excited at the same time using a DGC setting that produces VS overlap. The sensor array processor (SAP) 7 then calculates the time of arrival of the first echo pulse at each sensor simultaneously. This dramatically increases range data gathering speed. At the same time, however, since the VSs of the sensors overlap, the effective signal-to-noise ratio for the sensors increase. The net result is that for wall and objects that are strong sound reflectors, the sensors provide range data that better reflect the existence of those walls and objects.

For example in the case shown in FIG. 14a, with a conventional orthogonal firing pattern, sensors A, B, F and G would produce range data that would be longer than the wall position (they would "see" through the wall because of the existence of an open door). They may also not produce any range data at all. The darker VS traces show the range data returned for those sensors using the first firing.

The crosstalk in the range data gathered by all of the transducers causes the sensor system to miss potential openings in the environment (objects appear wider than they really are). Essentially, openings in walls are hidden from the sensor due to the crosstalk effect. In this invention, to counteract this effect, the range data returned using the large volume of sensitivity are analyzed (along with the data from the signal and noise processor connected to the sensor signal processor (FIG. 12c)) to determine which sensors have produced data that are potentially erroneous. The diagram illustrates one procedure for determining which sensor is producing potentially erroneous data. Objects that are large as sensed by the sonar array cause larger numbers of adjacent sensors to produce range readings that are very similar to each other. These regions of constant depth are determined by the SAP.

Now those sensors selected as candidates which have erroneous data are either fired a second time, using a different sensitivity volume, or if the sensor signal processor has two or more channels of depth gain compensation, the data that were simultaneously collected from the channel with a narrower volume of sensitivity may be used as data for the second firing for further processing (see FIG. 12b). For systems with only one DGC channel per transducer, rather than exciting only a selected number of transducers a second time, all transducers may be excited with a smaller VS.

The output of this process is a stream of data (range, signal and noise) from all the sensors for the first "firing", and a number of individual range readings for selected transducers for the second "firing".

Data Correction and Validation Process:

Within the Data Correction and Validation process (illustrated in FIG. 13a), the data entering is manipulated to generate a number of different outputs, depending on options selected by the navigation control processor. The possible options include:

1. Interleaving of narrow VS range data with those data from the wide VS setting. This process replaces the data from the wide VS setting with data from the selected sensors of the narrow VS setting.

2. Interleaving of range data (as in 1. above) and the addition of signal and noise data. The signal and noise data for the previous firing is returned to the NCP 9 to indicate the quality of the range data. For transducers where the signal is high and the compensated noise is low, the quality is good; conversely if the signal is low and the compensated noise is high, then the quality is bad.

3. Interleave range data as in 1, but filter them with the signal-to-noise data. The SAP 7 may decide whether or not to transmit the range data for any transducer to the NCP 9 depending on the signal, noise, range, and grouping of the sensor's data. Based on the range, signal and noise of neighboring sensors.

4. The data from the geometric data feature extraction process are used to correct the range data received from the wide VS and narrow VS settings (described below).

In addition to the above function, the NCP 9 also monitors the range, signal and noise data which may be also used to determine whether or not a sensor is functioning normally. These data are expected to be within certain ranges and are expected to hold relationships between each other. Whenever some sensor data appear to be outside that relationship, the range data may be replaced with a warning message to the NCP that there is a potential sensor malfunction.

Geometric Feature Extraction Process:

The input data to the geometric feature extraction process include the signal and noise data, the range data from both sensor firings, and the position and orientation of each sensor.

This process takes advantage of the crosstalk between sensors on the first firing. It uses the predefined position and orientation of each sensor to determine classification of targets into four classes: walls, inside corners, walls with outside corners and other objects (such as posts); calculation of the distance and orientation of targets with respect to the vehicle; and correction of raw range data for each sensor so that the data better reflect the classified targets (as referenced in item 4 of the data correction process).

Figure 9:
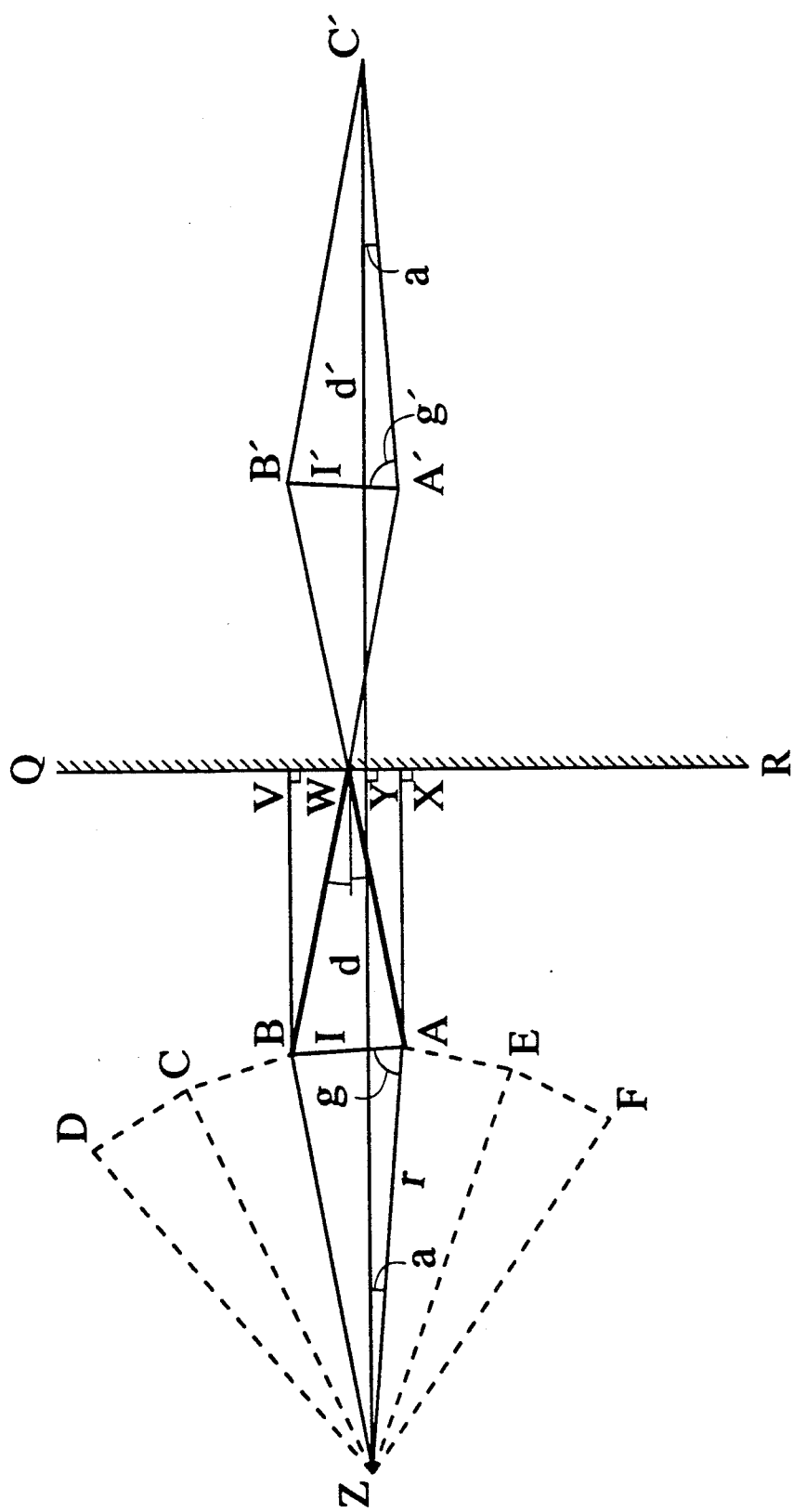

The geometry of the situation for two adjacent transducers is illustrated in FIG. 9. Triangle ZAB represents a sector of the sonar array in the plan view where the transducers are located at points A and b. Z is the center of the sonar array (and robot). The line QR represents a wall facing the transducers A and B. The construction to the right of QR is the virtual reflection of the transducer array that is used to determine the reflection paths between adjacent sensors. The assumptions used in geometric data extraction are that the transducers are point sources and receivers of sound, producing a sound emission pattern that has a spherical wave front.

The sensor system as described above produces a range output when the nearest echo of sufficient amplitude has been received. In FIG. 9, transducer A is the closest transducer to the wall. The angle a between line segments Zy and Za is the angular orientation of the wall with respect to the sensor array. Line ZY of length d is the orthogonal distance from the center of the sensor array to the wall. Angle g is the angle between the principal axes of adjacent transducers. Since A is the closest transducer to the wall, and because of the spherical wave front, the shortest path taken by the emitted sound will be along the line AX which is orthogonal to the wall. The distance then travelled by the sound that produces the echo first received by transducer A is 2*AX.

In the case of transducer B, if the transducer were excited by itself, the path of the first received echo would be along a line BV, orthogonal to the wall (as long as the sensor had a wide volume of sensitivity). Since transducer A is excited simultaneously with transducer B, the shortest first echo path is from transducer A, reflecting at point W to point B (since the length of AW+BW is less than 2*BV and the shortest path is a function of angle $a$ and the distance of the array from the wall). A mathematical relationship relates the sensor position and orientation, the lengths of the first echo paths for two sensors and the expected target geometry to the polar coordinates (distance and orientation with respect to the vehicle) of the target. This relationship is used to determine the angle a and distance d between the wall and the center of the sensor array. In other words a and d are functions of g, l, r, AX, and BW+AW. The sensor system captures 2*AX, BW+AW and g, l and r are known before-hand.

For other sensors that experience crosstalk from neighbors because of the target (e.g. D, C, E, F), similar relationships arise. By comparing the signal and noise values and the expected positions of the target objects using the data from each pair of sensors, the best approximation for the true position and orientation of the object is determined. One method is the use of a weighting process wherein the polar coordinates calculated for each pair of transducers is weighted based on the effective signal to noise ratio of the noisiest sensor of each pair. Then the object position may be calculated using a weighted average of the polar coordinates produced by each calculation.

Another way of performing this operation is by using the range of each adjacent transducer as points on a curve based on the mathematical relationships of echo paths for different targets and positions (see FIG. 10a.1). The SAP then attempts to match the range data for a ROCD with that curve. A match is attempted for the curves for a wall, and a wall with an outside edge, for example. The net result of such calculations is the determination of the polar orthogonal to a wall or the position of an inside or outside corner with a resolution that is related to the range resolution of the sensor rather than limited by the rather wide beam width of the sonar transducer.

FIG. 10a illustrates the signal paths for the first sonar excitation for a wall. The arrows indicate the direction of movement of the wave fronts from one sensor to another along the shortest distance path as determined by the laws of reflection. (The angle of incidence must equal the angle of reflection.) The expected target curve for the region of constant depth is shown in the inset.

Figure 10B:
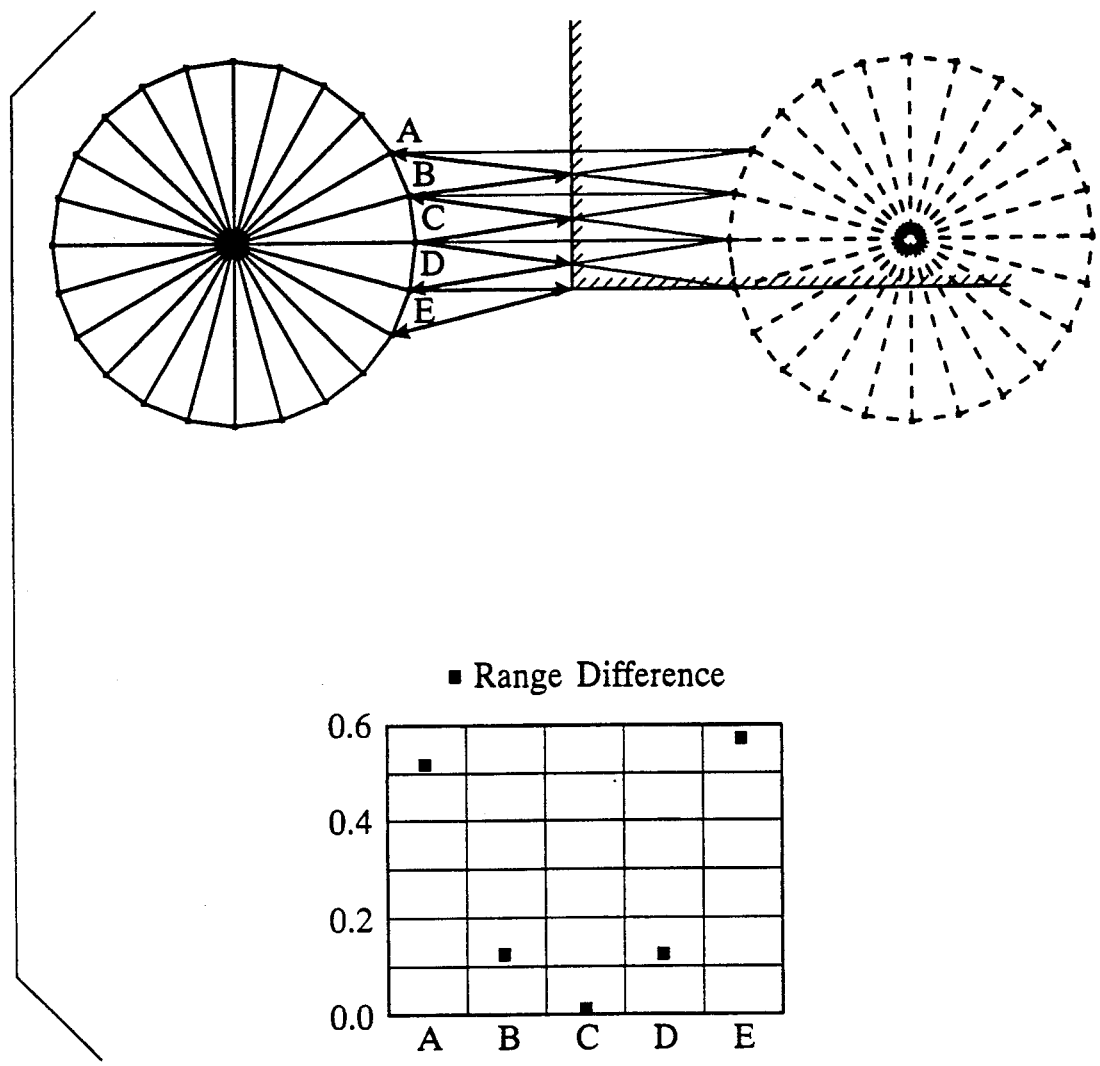
FIG. 10e shows typical echo paths for an outside corner or post.

The same principle may be applied to the position determined of partial walls or outside corners. An outside edge is a strong reflector of ultrasonic energy. The situation is illustrated in FIG. 10b. The shortest range measurement for the situation illustrated here will be sensed by sensor C. The first echo path (FEP) will be orthogonal to the wall. The FEP for transducers C, D and B will follow the same relationship as those for the case of a wall, i.e. the FEP for transducer B is from C to B reflecting off the wall and obeying the laws of reflection, and for transducer D it is from C to D by reflection off the wall. Transducer E may detect an echo from the sound emitted by transducer D and reflected off the corner, depending on the position of the corner and the reflective qualities of the corner and the VS setting. The position of the corner may then be estimated based from the position and orientations of sensors D and E and the measured range (FEP) using this triangulation procedure. Note that for the situation shown in FIG. 10b, the FEP length for transducer E is longer than transducer A whereas the path length for transducer D is the same as that for transducer B. This skewing of path lengths for transducers on the edge side of the target determines which side the edge is on. The degree of skew determines the approximate position of the corner.

Figure 10C:
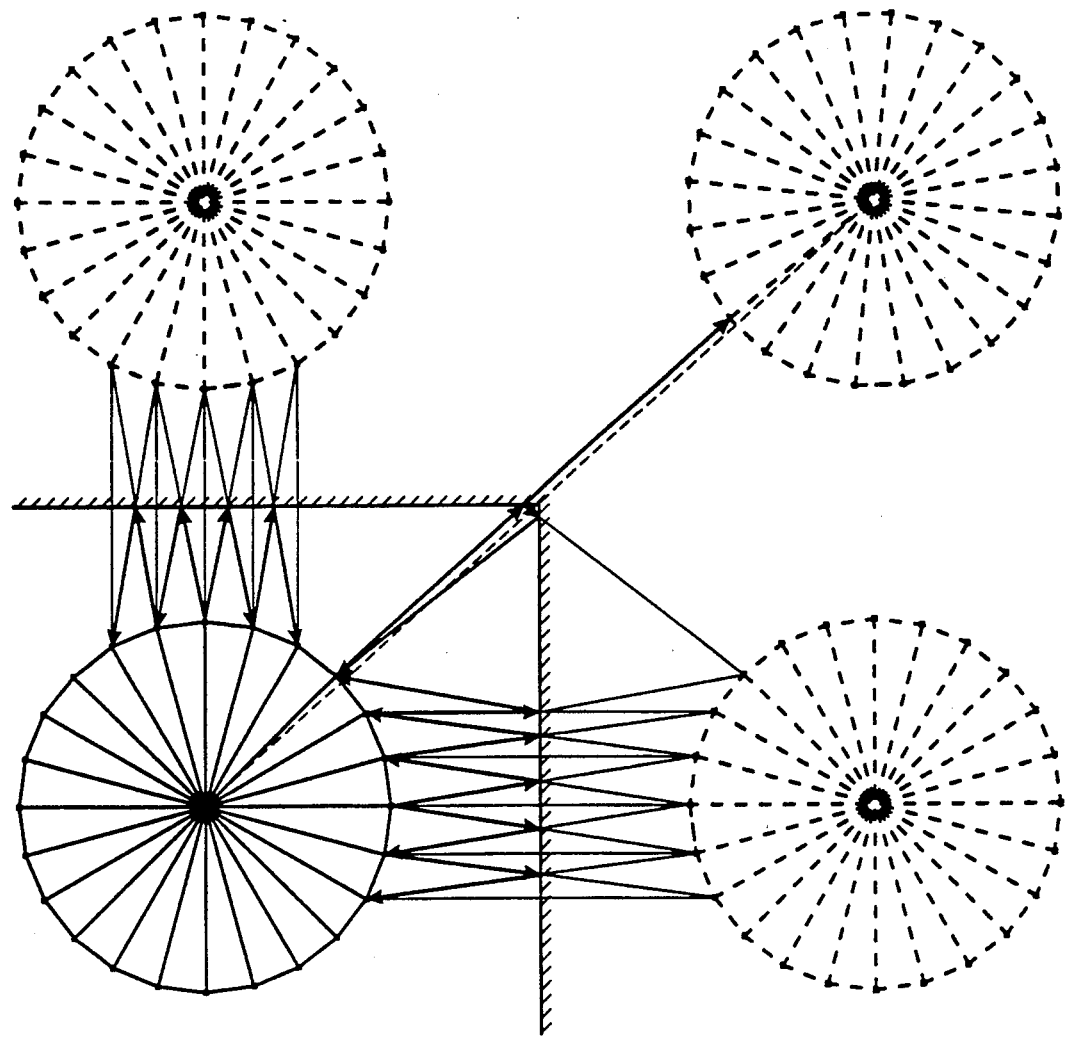

The situation for an inside corner is shown in FIG. 10c and FIG. 14. The range data for the first excitation exhibit the crosstalk relationship for the two walls as described above. Since the echo from the corner takes longer to arrive, and because of sensor crosstalk, sensors pointing in the direction of the corner may not receive the corner reflection as the first echo.

FIG. 15a shows real data from a sonar array. The first excitation data 29 is shown darker than the excitation data 31 from the second firing. As seen here the first excitation does not detect the inside corners.

Figure 10D:
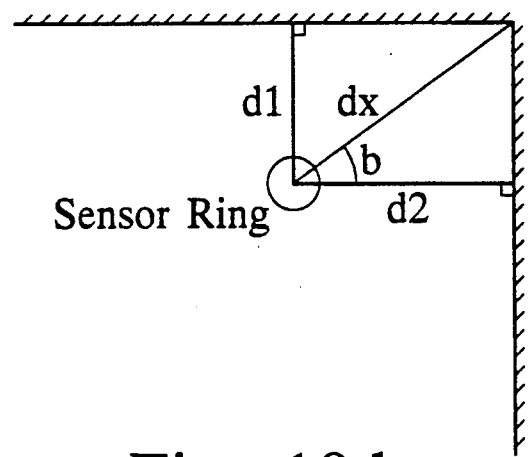

The range readings for the sensors pointing to the walls that meet at an inside corner are used to calculate the polar coordinate to a line normal to the wall, d1 and d2 (FIG. 10d). The angles for these normals are subtracted to determine the angle that the walls meet at the corner. For most indoor walls the angle will be ninety degrees. In this case, the polar coordinates for the corner position may be calculated using the following equations: angle: $b=\text{atan } d1/d2$ and the distance to the corner: $dx=\text{sqrt}(D^2+D2^2)$. With this information the range data from the sensor(s) pointing closest to the direction of the probable corner for the second firing may be compared to the calculated (expected) corner position.

Depending on the polar coordinates of the corner more than one sensor may be excited or a wider VS may be used. If the range reading is shorter than expected, the corner may be occluded by another object. If the range is longer than expected, then there is most likely an outside corner (leading to a passageway) between the detected normals to the wall and the expected corner.

The NCP may gather odometry information as it obtains geometric range information from the sensor controller. By keeping track of the positions of partial walls and potential and measured corner positions, the NCP can build up a complete map of the objects in the environment.

Figure 10E:
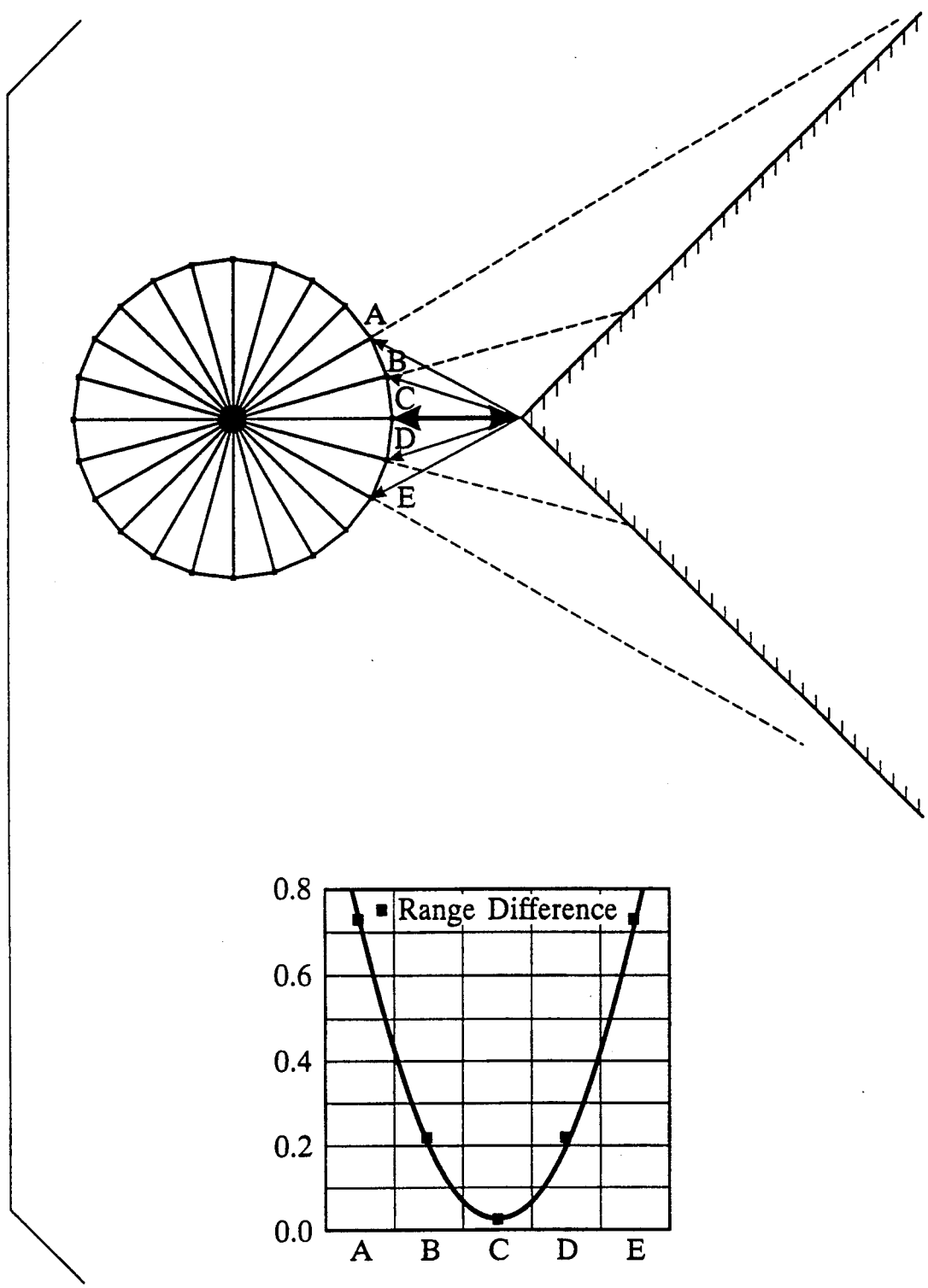

FIG. 10e shows the effect of a narrow object in the field of view of the sensor array (in this case a corner or a vertical pipe) when the object is situated along the principal axis of one sensor. Depending on the VS and the position of the target, as few as one and as many as 5 sensors may be affected by the object if all sensors are excited at once. The shortest first echo path (FEP) length for the sensors not pointing directly at the object is between neighboring sensors (i.e. from the sensor pointing at the object to the neighboring sensor(s)). The FEP length for sensors on either side of the transducer pointing most directly at the object is longer than that for walls or the partial walls with outside edges. These differences become smaller as the object is further away (relative to the diameter of the sensing array). The SAP must measure the time of arrival of the first echo with high resolution in order to distinguish these differences (a resolution of a few millimeters).

As well as differences in path length there are differences in signal and noise data between a narrow object and the wall reflector. The signal to noise ratio for the transducers on either side of the center transducers are lower for a narrow object than those for a wall. This fact along with the slight difference in FEP length relationships are used in combination to differentiate between short walls and narrow objects.

FIG. 13a illustrates the data validation and correction process. There are a number of different ways in which the information extracted from the above processes can be transferred to the NCP. The most trival is a return of all of the sensor range data readings and the signal and noise data to the NCP. In this case the NCP would perform the processes required to infer information about the objects in the environment.

Another technique is to replace range readings from the first excitation with those selected for the second excitation (on the basis of the techniques described in the sensor excitation speed-up process). Along with these data, the signal and noise data may be sent. Or alternatively, the signal to noise ratio may be used to select which range data of the first firing will be replaced with those of the second firing.

Yet another technique is to alter the range data for each sensor to best reflect the geometric features extracted by the system. For example, in FIG. 15, transducers A, B, C, D, E, F and G all exhibit range readings typical of those expected from a wall when all sensors are fired with overlapping VSs. Since the system extracts the angular orientation and distance of a wall that would produce such a pattern, this information may be used to generate range readings that would line up along the detected wall. The end result is an emulation of ideal ranging sensors.

For example, the corrected range of sensor A is calculated by examining the right angled triangle formed by the following three lines (FIG. 15b): XY—the line normal to the wall and passing the center of the sensor array (as calculated by the geometric extraction process), YX—the line from the center of the array through sensor A to the extracted wall, and line ZX. The angle a is the angular offset between the line from the center of the array to the sensor with the shortest range reading from the first firing and the normal to the wall. The corrected range reading Rc is: Rc=d/(sin(a+3*m)-r where m is the angle between the principal axes of adjacent sensors and r is the radius of the sensor array. Similar analysis may be applied to sensors that point in the direction of other extracted features.

Target classification involves matching patterns of range data with those expected from a specific set of targets. This geometric data may also be returned to the NCP as a single polar coordinate pair or pairs of polar coordinates joining the following point types:
1. Unknown objects (single polar coordinate)
2. Outside corners (single polar coordinate)
3. Inside corners
4. Potential inside corners: a corner that was calculated as a connection of two lines but was obstructed on the second sensor excitation
5. Indefinite wall ends Items 3–5 are returned as pairs of polar coordinates in any combination. For example, an inside corner is matched with an indefinite wall end to delimit the range data from a sensor group pointing at a partial wall. Along with the polar coordinates for the geometric data, the SAP may also return a number which represents the degree of fit between the range data dn the classified targets. This number may be the average percentage error between each transducer range reading and the expected FEP for the classified target for each transducer.

There will be some range data that do not fit any of the geometric relationships as expected from walls, inside corners and outside corners. These are considered unknown objects and are returned as single polar coordinates.

It should be realized that the invention may be practiced with a variety of sensor types and positioning. As well, the system may be used to determine the position of object types other than corners and walls. For example, the system may be used to determine the presence of an uniquely shaped object that serves as a landmark in the environment. The basic principles of the invention would be the same as described here.

A person understanding this invention may now conceive of alternative structures and embodiments or variations of the above. All of those which fall within the scope of the claims appended hereto are considered to be part of the present invention.

I claim:

1. A method of determining range data in a time-of-flight ranging system comprising:
   (a) emitting plural energy emissions from at least one transducer in the same direction, one emission being emitted and received in a broad sensing volume and another in a narrow sensing volume,
   (b) analyzing echoes resulting from said emissions to determine the existence and position of an obstacle based on the broad sensing volume, and
   (c) determining one or both of the existence and position of the obstacle or features thereof based on the narrow sensing volume in the presence of anomalous resulting determinations based on the broad sensing volume.

2. A method as defined in claim 1 including the step of determining from the echoes resulting from the broad sensing volume, the types of objects or features and their size.

3. A method of determining range data in a time-of-flight ranging system comprising:
   (a) emitting plural energy emissions from at least one transducer in the same direction, one emission being emitted and received in a broad sensing volume and another in a narrow sensing volume,
   (b) analyzing echoes resulting from said emissions to determine the existence and position of an obstacle based on the broad sensing volume, and
   (c) determining the position of the obstacle or features thereof based on the narrow sensing volume in the presence of determinations based on the broad sensing volume establishing the types of objects or features and their size.

4. A method as defined in claim 1, wherein the broad beam emissions are provided by plural transducers each emitting and receiving in a broad sensing volume overlapping an adjacent broad sensing volume, and wherein the narrow sensing volume is provided by at least one transducer selected to emit as a result of said anomalous determinations.

5. A method as defined in claim 4 in which the narrow sensing volume is provided by plural selected transducers, the narrow sensing volume being sufficiently narrow as to avoid overlapping.

6. A method as defined in claim 5, in which determinations of one or both of the existence and position of an obstacle based on the narrow sensing volumes replaces the determinations based on the broad sensing volumes.

7. A method as defined in claim 1, including the step of storing characteristic pattern data relating to one or more of predetermined obstacles and features thereof, and comparing said determinations with said characteristics to establish the presence and position of a particular characteristic obstacle.

8. A method as defined in claim 7 including placing range data for individual transducers with range data that better fit the obstacles detected.

9. A method as defined in claim 1, including the step of integrating signals received by the transducers prior to said echoes, calculating an echo signal size to said integrated signals ratio, and determining an echoes signal validity confidence value proportional to the value of said ratio.

10. A method as defined in claim 5, wherein the broad sensing volume is emitted from each of said transducers simultaneously.

11. A method as defined in claim 1, in which the same transducers emit and receive energy emissions over narrow and broad volumes.

12. A method as defined in claim 11, in which the narrow and broad sensing volumes are created by varying the volume of sensitivity VS of each of said same transducers.

13. A method as defined in claim 12, in which the energy emissions are ultrasonic acoustic energy, and in which the VS is varied by varying the depth gain compensation of an echo signal received in a corresponding transducer.

14. A method as defined in claim 12, in which the energy emissions are at least one of acoustic and electromagnetic energy, and in which the VS is varied by varying the depth gain compensation of an echo signal received in a corresponding transducer.

15. A method as defined in claim 14, in which the depth gain compensation is effected for each of said same transducers in a single channel.

16. A method as defined in claim 14, in which the depth gain compensation is effected for each of said same transducers in plural channels.

* * * * *